United States Patent

Koester et al.

[11] 4,071,610
[45] Jan. 31, 1978

[54] MANUFACTURE OF GAMMA-IRON(III) OXIDE

[75] Inventors: Eberhard Koester, Frankenthal; Gerd Wunsch, Speyer; Eduard Schoenafinger, Ludwigshafen; Hans Henning Schneehage, Mutterstadt, all of Germany

[73] Assignee: BASF Aktiengesellschaft, Ludwigshafen, Germany

[21] Appl. No.: 677,920

[22] Filed: Apr. 19, 1976

[30] Foreign Application Priority Data

May 9, 1975   Germany ............................ 2520643

[51] Int. Cl.² ............................................ C01G 49/02
[52] U.S. Cl. .................................. 423/634; 252/62.56
[58] Field of Search ....................... 423/634; 252/62.56

[56] References Cited

U.S. PATENT DOCUMENTS

| | | | |
|---|---|---|---|
| 3,015,627 | 1/1962 | Ayers et al. | 423/634 |
| 3,382,174 | 5/1968 | Hund | 423/634 |
| 3,652,334 | 3/1972 | Abeck et al. | 252/62.56 |
| 3,894,970 | 7/1975 | Adams et al. | 423/634 |
| 3,897,354 | 7/1975 | Woditsch et al. | 252/62.56 |
| 3,931,025 | 1/1976 | Woditsch et al. | 423/634 |
| 3,947,502 | 3/1976 | Leitner et al. | 423/634 |
| 3,974,079 | 8/1976 | Woditsch et al. | 423/634 |

FOREIGN PATENT DOCUMENTS 1,176,111   8/1964   Germany ............................ 423/634

Primary Examiner—O. R. Vertiz
Assistant Examiner—Wayne A. Langel
Attorney, Agent, or Firm—Keil, Thompson & Shurtleff

[57] ABSTRACT

A process for the manufacture of acicular gamma-iron-(III) oxide, in which the non-magnetic, acicular iron-(III) oxide is treated with a solution of a compound of the formula I

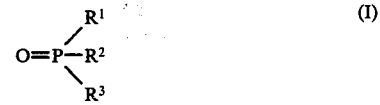

where $R^1$ and $R^2$ are

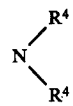

or $O-R^5$, $R^3$ is H, OH,

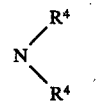

or $O-R^5$, $R^4$ is alkyl or cycloalkyl of 1 to 16 carbon atoms and the $R^4$'s may be identical or different, and $R^5$ is alkyl, cycloalkyl or aralkyl of 3 to 18 carbon atoms, and is then converted to gamma-iron(III) oxide by reduction to magnetite, followed by oxidation.

The gamma-iron(III) oxide obtained is distinguished by a high coercive force and improved magnetic orientation when used as a magnetic pigment for the manufacture of magnetic recording media.

2 Claims, No Drawings

MANUFACTURE OF GAMMA-IRON(III) OXIDE

The present invention relates to a process for the manufacture of acicular gamma-iron(III) oxide which has a high coercive force and gives improved magnetic orientation.

Acicular gamma-iron(III) oxide with a length/width ratio of the needles of from 20:1 to 3:1 is still the magnetic pigment predominantly used in magnetic recording media. It is manufactured by dehydrating non-magnetic acicular goethite to alpha-iron(III)oxide, reducing the latter to magnetite and then oxidizing the product to gamma-iron(III) oxide.

The size and shape of the particles have a decisive effect on the magnetic properties of gamma-iron(III) oxide. It is true that the size and shape of the magnetic gamma-iron(III) oxide particles are largely fixed by the dimensions of the non-magnetic goethite or alpha-iron(III) oxide particles employed for conversion to gamma-iron(III) oxide, but the way in which the conversion is carried out also plays a decisive role. If the dehydration of the goethite to alpha-iron(III) oxide, or the subsequent reduction of the alpha-iron(III) oxide to magnetite, is carried out at too high temperatures, the needles sinter to form larger particles and agglomerates.

This effect manifests itself in a decrease in coercive force and furthermore makes the magnetic pigment more difficult to disperse in the binder system, and results in inadequate magnetic orientation being achievable after coating. However, it is also possible to carry out the dehydration and the reduction at relatively low temperatures, so that the disadvantages described do not manifest themselves to the same degree. However, lower space-time yields and less advantageous signal-to-print-through ratios must then be accepted.

It has been disclosed to add phosphate ions (German Pat. No. 1,176,111 and German Published Application No. 2,122,312) or surface-active substances, eg. polyphosphates (DL Pat. No. 74,306) to the reaction mixture during manufacture of the goethite, at the stage of precipitation from the acid or alkaline medium. This influences the crystal growth. Apart from the fact that the particles of the gamma-iron(III) oxide obtained should show certain differences in external shape, depending on their end use, the above problem in the conversion of goethite to magnetic iron oxide are not eliminated by the said additives.

Processes for converting goethite into gamma-iron(III) oxide have also been disclosed, in which sintering can be prevented by coating the surface of the particles of the non-magnetic starting material with inorganic substances which are resistant to hydrolysis, eg. oxyacids of phosphorus and/or boron or their salts (German Published Application No. 1,592,214). It has also already been proposed to treat goethite with chromium(III) oxide or its hydrates (German Published Application No. 1,803,783) or with solutions of aluminum, titanium or zirconium salts and alkali metal silicates, the pH of the solutions being adjusted to values at which hydrolysis starts (German Printed Application No. 1,252,646).

It is true that these methods make it possible substantially to retain the acicular shape during the conversion process and thereby to manufacture gamma-iron(III) oxides with higher $H_c$ values, but the gamma-iron(III) oxides thus obtained are frequently difficult to disperse in an organic binder. Moreover, the relatively poor orientation of such coated particles has an adverse effect on the quality of a magnetic recording medium.

German Printed Application 1,771,327 discloses coating goethite or alpha-iron(III) oxide with a hydrophobic aliphatic carboxylic acid or with such an acid and morpholine, followed by the direct conversion of the pigments, which have been treated in this way, to gamma-iron(III) oxide in air at elevated temperatures. However, this direct conversion has the disadvantage that it is no longer possible to interpolate a heat treatment at intermediate stages of the manufacture of the gamma-iron(III) oxide, whilst such a treatment is of particular advantage when manufacturing low-noise iron oxides with low print-through properties for use as magnetic pigments in magnetic recording media. Furthermore, though it is true that pigments which give good orientation are obtained, it is not possible to use this process for the manufacture of iron oxide pigments having a high coercive force. A similar coating of iron oxide pigments to avoid agglomeration after manufacture, as disclosed in German Printed Application No. 1,767,608, has the disadvantage that the pigment suspension used must first be brought to a pH of about 7, which may entail extra expense, depending on the manufacturing process.

It is an object of the present invention to provide a process for the manufacture of acicular gamma-iron(III) oxide of high coercive force, which gives particularly good magnetic orientation when used as a magnetic pigment for magnetic recording media, and permits the production of tapes with particularly low print-through properties.

It is a further object of the present invention to provide a process which is applicable regardless of the method of manufacture of the starting material, namely the goethite, and regardless of the additional advantageous process steps employed in conversion of the goethite to gamma-iron(III) oxide.

We have found that these objects are achieved and that an acicular gamma-iron(III) oxide having a high coercive force and giving improved magnetic orientation can be manufactured by a process comprising the steps of a. mixing a suspension of non-magnetic, acicular iron(III) oxide powders with a solution of a compound of the formula I

where $R^1$ and $R^2$ are

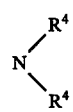

or $O-R^5$, $R^3$ is H, OH,

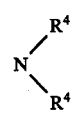

or $O-R^5$, $R^4$ is alkyl or cycloalkyl of 1 to 16 carbon atoms and the $R^4$'s may be identical or different, and $R^5$ is alkyl, cycloalkyl or aralkyl of 3 to 18 carbon atoms, in water or alcohols of 1 to 4 carbon atoms, and then removing the solvent, b. reducing the material, obtained according to (a), by means of gases containing hydrogen, at from 350° to 600° C, to give magnetite, and c. oxidizing the magnetite, by means of gases containing oxygen, at from 200° to 450° C, to give gamma-iron-(III) oxide.

According to one particular embodiment of the invention, the non-magnetic acicular goethite or the alpha-iron(III) oxide obtained therefrom by dehydration is suspended in a solvent, advantageously water or a lower alcohol of 1 to 4 carbon atoms, and maintained in suspension by vigorous stirring. A solution of a compound of the general formula I, in one of the above solvents, is now added to the said suspension and the entire batch is stirred for some time; usually, from 5 to 60 minutes suffices. The iron oxide treated with the compound of the formula I is then filtered off, dried to remove residual solvent, and processed further by conventional methods to give gamma-iron(III) oxide.

Suitable compounds of the formula I are alkylphosphonic acid esters and cycloalkylphosphonic acid esters, eg. ethyl cyclohexanephosphonate, phenyl cyclohexanephosphonate, diethyl 1-phenylvinyl-1-phosphonate, phosphorous acid esters, eg. diethyl phosphite and diisopropyl phosphite and especially triphenyl phosphite, and phosphoric acid esters, eg. tricresyl phosphate, tris-(2-ethylhexyl) phosphate, di-isononyl phosphate, tri-isodecyl phosphate, di-isodecyl phosphate, di-dodecyl phosphate, tris-dodecylphenyl phosphate, bis-dodecylphenyl phosphate and especially tributyl phosphate, and phosphoric acid amides, in particular hexamethylphosphoric acid triamide. The corresponding pyrophosphoric acid compounds may be employed equally advantageously.

Suitable solvents used for the above compounds are the lower alcohols, e.g., ethanol. However, other solvents may also be used, provided they are miscible with those solvents in which the iron oxides are suspended.

The amount of the compounds of the formula I which is added in the process according to the invention is suitably from 0.5 to 10%, based on goethite, and an amount of from 2 to 6% has proved advantageous.

The further processing of the iron oxides, treated as above, to give gamma-iron(III) oxide, is carried out by conventional methods. In these, the treated alpha-iron-(III) oxide or goethite is first reduced in a reducing gas atmosphere, preferably by means of hydrogen, at from 350° to 600° C, to give magnetite.

The magnetite is then oxidized to gamma-iron(III) oxide, advantageously by passing air over it, or admitting oxygen, suitably at from about 200° to 450° C. Both before and after the reduction of the alpha-iron(III) oxides or goethites it may prove advantageous, with respect to the properties of the gamma-iron(III) oxide, to subject the particular product to a conventional heat treatment.

In carrying out the process of the invention it has proved particularly advantageous that the reduction of the treated iron oxides with magnetite takes place, with good results, even below 600° C, and preferably at from 400° to 550° C. This is surprising inasmuch as it is known from German Published Application No. 1,592,214 that with increasing reduction temperature the crystal structures of the magnetizable gamma-iron-(III) oxide become more highly developed and freer from defects, which normally increases the coercive force and the signal-to-print-through ratio of magnetic recording media manufactured using such gamma-iron-(III) oxides.

The dependence of the magnetic properties, eg. coercive strength and magnetic orientation, on the reduction temperature is shown in Example 1. We have found that as the reduction temperature rises, the coercive force rises and the magnetic orientation falls. However, even at an elevated reduction temperature, the magnetic orientation ratios obtained are far above those obtained in the Comparative Experiments according to the prior art.

The process according to the invention is also applicable to the manufacture of cobalt-modified gamma-iron(III) oxides. Because of the improved magnetic properties of these, as compared to the unmodified pigment, the manufacture of such modified magnetic pigments is of great interest, but on the other hand the incorporation of cobalt into the crystal lattice results in thermal and mechanical instability which is known to be disadvantageous. Because of the almost complete retention of the acicular form and hence of the pronounced dimensional anisotropy the process according to the invention produces an advantageous effect even in the case of cobalt-modified gamma-iron((III) oxide.

Cobalt-modified gamma-iron(III) oxide in general suffers from the disadvantage of multiaxial magnetic anisotropy and its magnetic properties are therefore highly temperature-dependent. This disadvantage can be avoided if, in accordance with German Published Application No. 2,243,231, the finished gamma-iron(III) oxide is modified with cobalt without carrying out a heat treatment at above 250° C. According to this process for the manufacture of cobalt-modified gamma-iron(III) oxide, the cobalt compound is applied to the gamma-iron(III) oxide or to the magnetite obtained in the preceding stage and the product carrying the cobalt compound is heated, specifically at from 120° to 250° C. In this process, acicular, non-magnetic iron(III) oxides are employed which, prior to their reduction to magnetite, have been provided with a protective coating to avoid sintering of the needles. In this way, a cobalt-modified gamma-iron(III) oxide having uniaxial magnetic anisotropy and possessing magnetic properties which are only slightly temperature-dependent is obtained.

Gamma-iron(III) oxide pigments which have been manufactured by the process of the invention exhibit, even after having been cobalt-modified as described above, the same high degree of magnetic orientation which is achievable without additional modification with cobalt.

Particularly high coercive forces are achieved by cobalt-modifying the goethite by precipitating cobalt hydroxide onto it by conventional methods, then applying a coating in accordance with the process of the invention, thereafter converting the product to gamma-iron(III) oxide by conventional methods and then further modifying the product with cobalt. Gamma-iron-(III) oxides which have been modified in this way also permit particularly good magnetic orientation. It has proved particularly advantageous to modify the goethite with not more than 1.5 percent by weight of cobalt, based on the amount of iron oxide. In this way, the effect on the temperature dependence of the magnetic properties at above $-10°$ C is minimal, whilst the coercive force is increased substantially.

Using the process of the invention, it is possible to manufacture acicular gamma-iron(III) oxides which are distinguished by high coercive force and which in particular differ clearly from conventional gamma-iron-(III) oxides in respect of improved magnetic orientation when used as a magnetic pigment for the manufacture of magnetic recording media, coupled with good dispersibility of the particles in the organic binder system.

To produce magnetic coatings, the gamma-iron(III) oxide manufactured according to the invention is dispersed in polymeric binders. Suitable binders for this purpose are conventional compounds, eg. homopolymers and copolymers of vinyl derivatives, polyurethanes, polyesters and the like. The binders are used in the form of solutions in suitable organic solvents, which may contain further additives, eg. to increase the conductivity and abrasion resistance of the magnetic coatings. On milling the magnetic pigment, the binder and any additives, a homogeneous dispersion is obtained, which is coated by conventional methods onto rigid or flexible bases, eg. films, discs or cards. Immediately after applying the dispersion to the base, the magnetic particles are oriented, in the intended recording direction, by means of a magnetic field. Only then are the magnetic coatings dried and, if desired, subjected to a surface-finishing treatment.

The Examples which follow illustrate the invention.

The magnetic properties were measured with a vibrating sample magnetometer at a field strength of 160 kiloamps/m. The coercive force $H_c$ [kA/m] was in each case determined at a tap density $\rho$ [g/cm$^3$]. The improved magnetic orientation was demonstrated by measuring the orientation ratio RF, i.e. the ratio of the residual induction in the preferred direction of the magnetic particles in the magnetic coating to the residual induction in the crosswise direction. The magnetic recording medium required for this purpose was produced by dispersing the magnetic pigments, obtained in accordance with the Examples which follow, in a solution of a copolymer of vinyl chloride, dimethyl maleate and diethyl maleate and a thermoplastic polyester-urethane, using conventional dispersing aids, applying this dispersion by conventional methods to a 12μ thick polyethylene terephthalate film, in an amount which leaves a 5μ thick magnetic coating after drying, orienting the coating, whilst still fluid, by a magnetic field, and drying the coating.

The parts and percentages in the Examples are by weight.

EXAMPLE 1

300 parts of an acicular alpha-FeOOH, manufactured by an alkaline method in accordance with German Printed Application No. 1,204,644, are suspended in 4,500 parts of water and finely distributed by means of a high-speed stirrer. A solution of 9 parts of di-dodecyl-phenyl phosphate in 150 parts of ethanol is then added, the suspension is stirred for 15 minutes and the pigment is filtered off and dried at 100° C under reduced pressure. It is reduced to Fe$_3$O$_4$ in a stream of hydrogen, and the product is oxidized at 250° C in a mixture of nitrogen and air, to give gamma-Fe$_2$O$_3$. The variation in magnetic properties with reduction temperature is shown below:

| Reduction temperature | $H_c$ | $\rho$ | RF |
|---|---|---|---|
| 380° C | 33.0 | 0.476 | 3.2 |
| 450° C | 33.5 | 0.569 | 3.0 |
| 500° C | 35.0 | 0.718 | 2.7 |

EXAMPLES 2 TO 5

Alpha-FeOOH from Example 1 is dispersed in water as described in the said Example, treated with the phosphoric acid esters or phosphorous acid esters shown in Table 1, and worked up as in Example 1. Table 1 shows the reduction temperature and the measured magnetic values. A further increase in $H_c$ is achieved by cobalt-modifying the gamma-Fe$_2$O$_3$ pigments. For this purpose, the gamma-Fe$_2$O$_3$ is dispersed in water, the amount of CoCl$_2$.6H$_2$O which corresponds to 3% of Co is added, and the pH is brought to 10 with dilute NaOH. The pigment is filtered off and dried at 200° C. A Co-modified gamma-Fe$_2$O$_3$ having temperature-independent magnetic properties and the same increased orientation ratio as gamma-Fe$_2$O$_3$ which has not been Co-modified is obtained (see Table 1).

TABLE 1

| Example | Alpha-FeOOH treated with | Reduction temperature | Co, based on gamma-Fe$_2$O$_3$ | $H_c$ [kA/m] | $\rho$ [g/cm$^3$] | RF (tape) |
|---|---|---|---|---|---|---|
| 2 | 3% of di-isononyl phosphate | 500° | — | 36.0 | 0.584 | 2.9 |
|   |   |   | 3% | 38.2 | 0.721 | 2.9 |
| 3 | 3% of tributyl phosphate | 550° | — | 38.7 | 0.500 | 2.8 |
|   |   |   | 3% | 40.1 | 0.596 | 2.8 |
| 4 | 3% of tributyl pyrophosphate | 500° | — | 38.5 | 0.520 | 2.6 |
|   |   |   | 3% | 39.3 | 0.714 | 2.6 |
| 5 | 3% of triphenyl phosphite | 550° | — | 37.5 | 0.590 | 2.6 |
|   |   |   | 3% | 40.8 | 0.685 | 2.6 |

EXAMPLE 6

300 parts of the acicular alpha-FeOOH from Example 1 are dispersed in 4,500 parts of ethanol and 7.5 parts of hexamethylphosphoric acid triamide are added whilst stirring. The alcohol is then removed by evaporation under reduced pressure at 50° C. The pigment is dried at 100° C under reduced pressure. After reduction at 450° C in a stream of hydrogen, and oxidation at 250° C, a gamma-Fe$_2$O$_3$ having the following properties is obtained:

$H_c = 37.8$; $\rho = 0.631$; RF = 2.7.

After modification with 3% of Co by the method described in Examples 2 to 5, a temperature-independent Co-modified gamma-Fe$_2$O$_3$ having the following properties is obtained:

$H_c = 39.7$; $\rho = 0.799$; RF = 2.7.

EXAMPLE 7

300 parts of alpha-FeOOH from Example 1 are dispersed in 4,500 parts of water and 22.2 parts of Co(-NO$_3$)$_2$.6H$_2$O, dissolved in 100 parts of water, are added.

Aqueous ammonia solution is added dropwise, whilst stirring, until the pH is 10. The product is filtered off, washed with water until the pH is 7 - 8 and again suspended in water, and 9 parts of tributyl phosphate, dissolved in 100 parts of ethanol, are added whilst stirring vigorously. The product is filtered off, dried at 100° C under reduced pressure, reduced to $Fe_3O_4$ at 550° C and oxidized to gamma-$Fe_2O_3$ at 250° C. This gives a gamma-$Fe_2O_3$, modified with 1.5% of Co, which has the following magnetic properties:

$H_c = 40.4; \rho = 0.600; RF = 2.6$.

After modifying with a further 3% of Co at the gamma-$Fe_2O_3$ stage, by the method described in Examples 2 to 5, a Co-modified gamma-$Fe_2O_3$ having the following magnetic properties is obtained:

$H_c = 42.5; \rho = 0.872; RF = 2.6$.

COMPARATIVE EXAMPLE 1 a. Untreated acicular alpha-FeOOH from Example 1 is reduced to $Fe_3O_4$ at 380° C in a stream of hydrogen, and the product is oxidized to gamma-$Fe_2O_3$ at 250° C. The final product has the following magnetic properties:

$H_c = 27.0; \rho = 0.947; RF = 2.0$.

After modifying the gamma-$Fe_2O_3$ with 3% of Co as described in Examples 2 to 5, the magnetic properties are found to be the following:

$H_c = 29.2; \rho = 0.944; RF = 2.0$.

b. Untreated alpha-FeOOH is converted to gamma-$Fe_2O_3$ under identical conditions to the above, except that the reduction temperature is 500° C. The following magnetic properties are found:

$H_c = 23.3; \rho = 1.108; RF = 1.7$.

COMPARATIVE EXAMPLE 2

300 parts of alpha-FeOOH from Example 1 are dispersed in 4,500 parts of water, as in Example 1, and 4.5 parts of 85% strength phosphoric acid are added. The suspension is then stirred for 15 minutes and the pigment is filtered off, dried at 100° C under reduced pressure, reduced to $Fe_3O_4$ at 600° C in a stream of hydrogen and oxidized at 250° C, by means of a mixture of air and nitrogen, to give gamma-$Fe_2O_3$. The pigment has the following magnetic properties:

$H_c = 36.7; \rho = 0.614; RF = 2.2$.

After modification with 3% of Co as in Examples 2 to 5, the following properties are measured:

$H = 38.4; \rho = 0.716; RF = 2.2$.

COMPARATIVE EXAMPLE 3

An alpha-FeOOH from Example 1 is modified with 1.5% of Co as in Example 7 and then treated with 1.5% of 85% strength phosphoric acid as in Comparative Example 2. After reduction to $Fe_3O_4$ at 550° C in a stream of hydrogen, and oxidation to gamma-$Fe_2O_3$ at 250° C, the following properties are measured:

$H_c = 38.2; \rho = 0.520; RF = 2.2$.

After modifying with 3% of Co, as described in Examples 2 to 5, the following magnetic properties are measured:

$H_c = 39.6; \rho = 0.662; RF = 2.2$.

We claim:

1. A process for the manufacture of acicular gamma-iron(III) oxide of high coercive force and giving improved orientation, which comprises the steps of a. mixing a suspension of non-magnetic, acicular alpha-FeOOH with a solution of a compound of the formula I

where $R^1$ and $R^2$ are

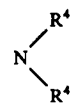

or O—$R^5$, $R^3$ is H, OH,

or O—$R^5$, $R^4$ is alkyl or cycloalkyl of 1 to 16 carbon atoms and the $R^4$'s may be identical or different, and $R^5$ is alkyl, cycloalkyl or aralkyl of 3 to 18 carbon atoms, in water or alcohols of 1 to 4 carbon atoms, and then removing the solvent, the amount of said compound I being from about 0.5 to 10 percent by weight based on said non-magnetic iron oxide, b. reducing the material, obtained according to (a), by means of gases containing hydrogen, at from b 350° to 600° C, to give magnetite, and c. oxidizing the magnetite, by means of gases containing oxygen, at from 200° to 450° C, to give gamma-iron(III) oxide.

2. A process as set forth in claim 1 wherein the amount of said compound I is from about 2 to 6 percent by weight based on said non-magnetic iron oxide.

* * * * *

UNITED STATES PATENT AND TRADEMARK OFFICE
CERTIFICATE OF CORRECTION

PATENT NO. : 4,071,610
DATED : January 31, 1978
INVENTOR(S) : Eberhard Koester et al It is certified that error appears in the above-identified patent and that said Letters Patent are hereby corrected as shown below:

Column 8, line 46, delete "b".

Signed and Sealed this

Twenty-sixth Day of September 1978

[SEAL]

Attest:

RUTH C. MASON
*Attesting Officer*

DONALD W. BANNER
*Commissioner of Patents and Trademarks*